(12) United States Patent
Wang et al.

(10) Patent No.: US 9,531,553 B2
(45) Date of Patent: Dec. 27, 2016

(54) METHOD, CONTROLLER, DATA CENTER, SYSTEM AND STORAGE MEDIUM FOR NETWORK CHARGING

(71) Applicant: ZTE Corporation, Shenzhen, Guangdong (CN)

(72) Inventors: Jing Wang, Shenzhen (CN); Na Zhou, Shenzhen (CN); Yifeng Bi, Shenzhen (CN); Jun Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/903,546

(22) PCT Filed: Apr. 30, 2014

(86) PCT No.: PCT/CN2014/076690
§ 371 (c)(1),
(2) Date: Jan. 7, 2016

(87) PCT Pub. No.: WO2014/169865
PCT Pub. Date: Oct. 23, 2014

(65) Prior Publication Data
US 2016/0164691 A1    Jun. 9, 2016

(30) Foreign Application Priority Data

Aug. 9, 2013  (CN) .......................... 2013 1 0347419

(51) Int. Cl.
*H04L 12/14* (2006.01)
*H04M 15/00* (2006.01)

(52) U.S. Cl.
CPC ....... *H04L 12/1407* (2013.01); *H04L 12/1403* (2013.01); *H04L 12/1435* (2013.01);
(Continued)

(58) Field of Classification Search
CPC ............ H04L 12/1407; H04L 12/1435; H04M 15/8214
See application file for complete search history.

(56) References Cited

U.S. PATENT DOCUMENTS

2011/0320580 A1* 12/2011 Zhou ...................... H04L 12/14
709/223
2012/0142311 A1   6/2012 Rui
(Continued)

FOREIGN PATENT DOCUMENTS

CN     102056124 A     5/2011
CN     102209310 A     10/2011
(Continued)

OTHER PUBLICATIONS

International Search Report in international application No. PCT/CN2014/076690, mailed on Jul. 18, 2014.
(Continued)

*Primary Examiner* — Ian N Moore
*Assistant Examiner* — Phong La
(74) *Attorney, Agent, or Firm* — Oppedahl Patent Law Firm LLC

(57) ABSTRACT

Disclosed is a method for network charging, which includes: a data center management network element, upon reception of a charging resource request message from a controller, supports a charging function of a processing network element by a virtual machine and feeding back information of the processing network element to the controller; the data center management network element sending charging strategy information, user state information and information of UGW to the processing network element, which implements transmission of a traffic flow with the UGW according to the information of UGW, charges for the traffic flow according to the charging strategy information and the user state information, and feeds back charging processing informa-
(Continued)

tion to the data center management network element; and the data center management network element feeding back the charging processing information to the controller. The disclosure further provides a data center, controller, UGW and system for network charging. Thus the charging service may be implemented for a SDN EPC network.

12 Claims, 6 Drawing Sheets

(52) U.S. Cl.
CPC ........... *H04M 15/43* (2013.01); *H04M 15/52* (2013.01); *H04M 15/64* (2013.01); *H04M 15/66* (2013.01); *H04M 15/8214* (2013.01); *H04M 15/8228* (2013.01)

(56) References Cited

U.S. PATENT DOCUMENTS

| | | | | |
|---|---|---|---|---|
| 2012/0220330 | A1* | 8/2012 | Goldner | H04L 12/1407 455/517 |
| 2012/0290452 | A1* | 11/2012 | Pancorbo Marcos | H04L 12/1407 705/30 |
| 2013/0091281 | A1 | 4/2013 | Chai et al. | |
| 2013/0114460 | A1* | 5/2013 | Rubio Vidales | H04L 12/1407 370/252 |
| 2014/0094138 | A1* | 4/2014 | Saker | H04L 12/1407 455/406 |
| 2015/0029894 | A1* | 1/2015 | Lu | H04M 15/61 370/259 |
| 2015/0319315 | A1* | 11/2015 | Chai | H04L 12/1407 455/406 |
| 2015/0341503 | A1* | 11/2015 | Chandramouli | H04L 12/1407 455/405 |
| 2015/0365537 | A1* | 12/2015 | Kahn | H04M 15/58 455/408 |
| 2016/0036598 | A1* | 2/2016 | Chai | H04L 43/028 370/259 |
| 2016/0072963 | A1* | 3/2016 | Cai | H04L 12/1407 370/259 |

FOREIGN PATENT DOCUMENTS

| | | |
|---|---|---|
| CN | 102264056 A | 11/2011 |
| CN | 102281521 A | 12/2011 |
| EP | 2466932 A1 | 6/2012 |
| EP | 2506493 A1 | 10/2012 |
| WO | 2012010183 A1 | 1/2012 |

OTHER PUBLICATIONS

Kempf J et al:"Moving the Mobile Evolved Packet Core to the Cloud". 2012 IEEE 8th International Conference on Wireless and Mobile Computing. Networking and Communications (WIMOB 2012) : Barcelona. Spain. Oct. 8-10, 2012. IEEE. Piscataway. NJ. Oct. 8, 2012 (Oct. 8, 2012). pp. 784-791. XP002717394. ISBN: 978-1-4673-1430-5, mailed on Oct. 8, 2012.

Supplementary European Search Report in European application No. 14784711.5, mailed on Jun. 21, 2016.

English Translation of the Written Opinion of the International Search Authority in international application No. PCT/CN2014/076690, mailed on Jul. 18, 2014.

* cited by examiner

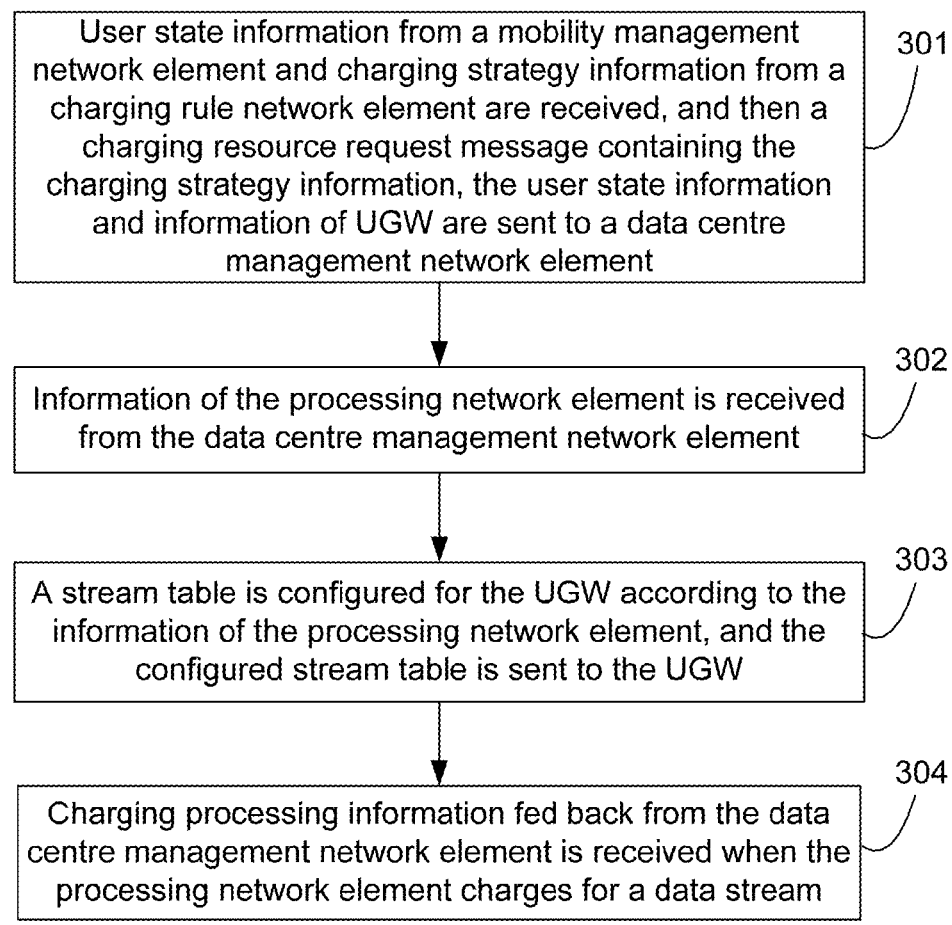
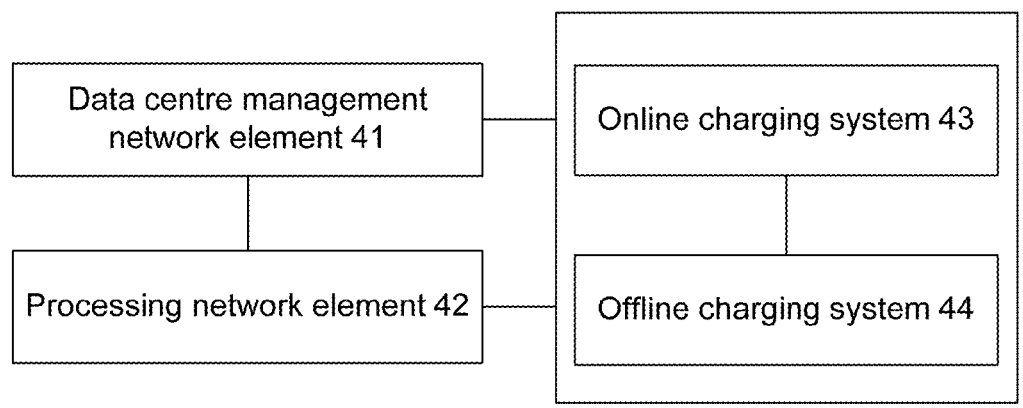

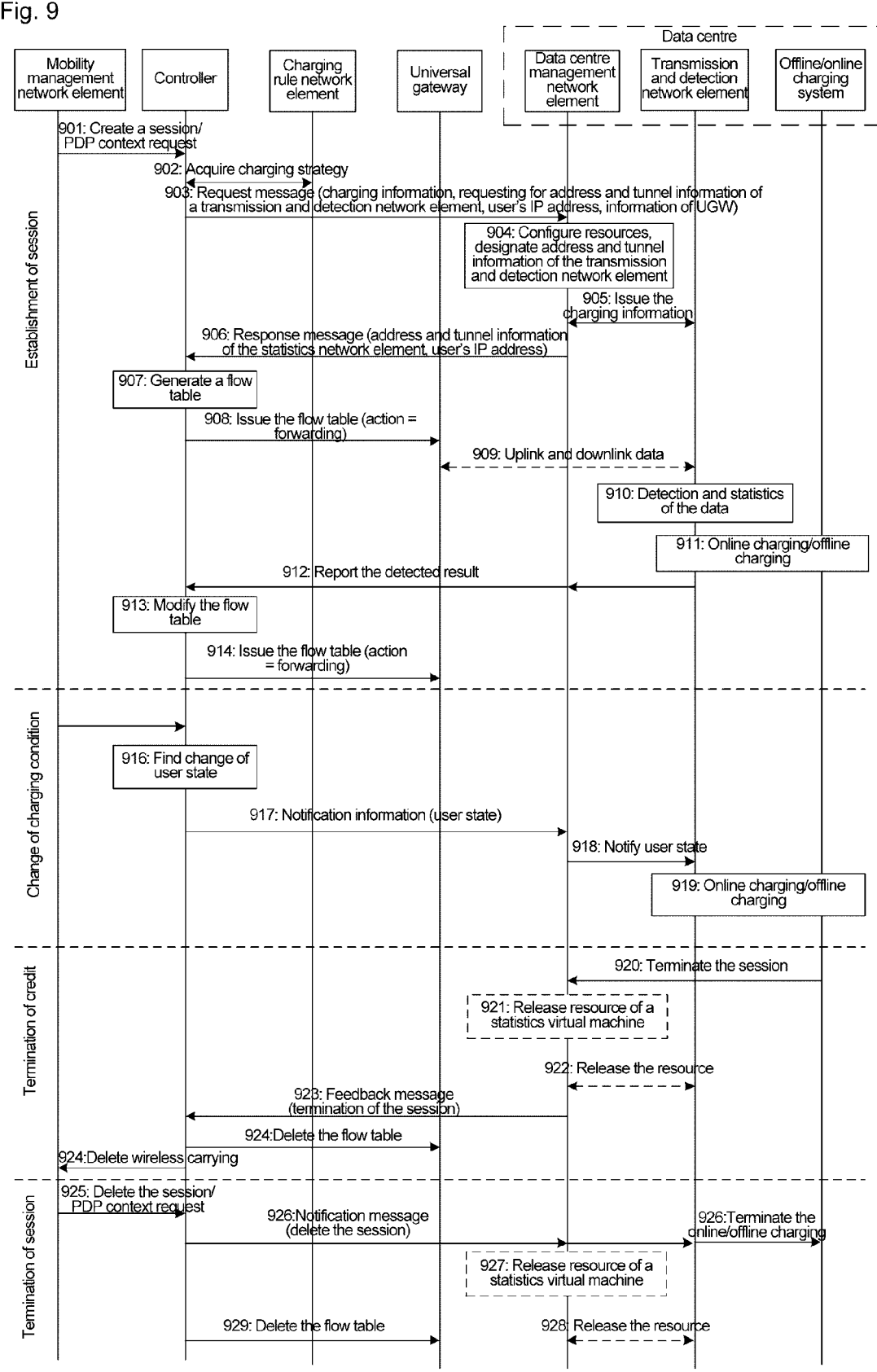

METHOD, CONTROLLER, DATA CENTER, SYSTEM AND STORAGE MEDIUM FOR NETWORK CHARGING

TECHNICAL FIELD

The embodiments of the disclosure relate to a software-defined network technology, the data centre virtualization technology and the 3rd Generation Partnership Project (3GPP)—packet domain (PS) core network technology, and in particular to a method, a controller, a data centre, a system and storage medium for network charging.

BACKGROUND

In 2008, Stanford University in the U.S.A. proposed an Open Flow protocol which uses an architecture in which forwarding plane and control plane are separated. In the architecture of the Open Flow protocol, a control plane entity takes use of a controller based on the Open Flow protocol to implement forwarding logics, while a forwarding plane entity takes use of a gateway based on the Open Flow protocol to implement controlled forwarding according to a flow table issued from the controller. The behaviour of the gateway is standardised. For example, after receiving a message, the gateway analyses the message to obtain the header, i.e. L2/L3/L4 related field values, and takes these values as the keywords for searching the flow table, and after an item in the flow table is matched, transforms the message field based on the instruction set in the content of the item, forwards the message to a certain logical or physical port according to the instruction of the item when the transformation is terminated. A Software Defined Network (SDN) is a further evolution of the Open Flow protocol. The SDN may implement a variety of complex network applications in the manner of software programming on the control plane without any change of the forwarding plane devices. Moreover, since the control plane takes use of universal servers and universal systems, universal software programming tools or computer programming languages such as Python may be used for implementing script programming. Thus, the implementation of novel network protocols through the forwarding plane becomes extremely simple and the deployment cycle of new technologies is reduced significantly.

An Evolved Packet Core (EPC) network is a novel packet core network introduced in the phase of 3GPP R8. The EPC leads to further flattened networks, in which devices on the forwarding plane are further divided into a Serving Gateway (SGW) and a PDN Gateway (PGW). Since the R8, the EPC has a series of enhanced functions, including introduced technologies such as traffic offload. These enhanced functions requires a period of 1 to 2 years for formulating new protocol specifications and then they are implemented by equipment suppliers, tested and deployed by operators. Thus, the introduction cycle of new network characteristics becomes long and costly. The Open Flow protocol aims at overcoming these problems. The introduction of a new characteristic of network may be achieved by only modifying the logic of the control network element, i.e. controller, in the Open Flow protocol, the controller controlling devices on the forwarding plane to implement this new function, which leads to a fast introduction of new network functions. However, the Open Flow protocol is currently mainly applied to layer-2 switching networks. It cannot support directly the network elements in EPC on which service control are needed. The introduction of the Open Flow mechanism will affect functions and control modes of existing user plane network elements in the EPC.

FIG. 1 is a schematic diagram illustrating the system architecture of a SDN EPC. The Unified Gateway (UGW) in FIG. 1 merely has user plane functions. All the control plane functions are implemented by the controller. The user plane functions includes: establishment, modification, assurance of Quality of Service (QoS) of a user plane tunnel, etc. The UGW may be divided into SGW and PGW according to its function under the logic control of the controller. The SGW and PGW are essentially UGWs with same functions, which enable the EPC to implement more flexible networking, and the controller may introduce application functions flexibly through an Application Program Interface (API) to enhance the capability of the EPC.

As the basic requirement of operators to a network, the implementation of a charging function should also be considered in the case of an EPC network based on SDN. In the prior art, a Charging Trigger Function (CTF), a Charging Data Function (CDF) and a Charging Gateway Function (CGF) are integrated in a PGW, which is responsible for collection of charging information and credit control, and supports the interface to the charging system network element, so as to implement functions of offline/online charging and content charging. In view of implementation, compared with UGWs in a SDN network, charging function packet gateways in the prior art require logical control operations related to charging in addition to a forwarding function, leading to complex logics and high cost without universality, thus being no longer adapted for the new generation mobile communication network in which the control and forwarding are separated.

SUMMARY

In order to address the above problems, the embodiments of the present disclosure provide a method, a controller, a data centre and system and storage medium for network charging, enabling the charging service to be implemented for a SDN EPC network and executed simply with low cost and high universality.

The technical scheme of the present disclosure is implemented as follows:

A method for network charging includes:

upon reception of a charging resource request message from a controller, a data centre management network element supports a charging function of a processing network element by a virtual machine and feeds back information of the processing network element to the controller, wherein the charging resource request message comprises charging strategy information, user state information and information of a universal gateway (UGW);

the data centre management network element sends the charging strategy information, the user state information and the information of the UGW to the processing network element;

the processing network element implements transmission of a traffic flow with the UGW according to the information of the UGW, charges for the traffic flow according to the charging strategy information and the user state information, and feeds back charging processing information to the data centre management network element; and the data centre management network element feeds back the charging processing information to the controller.

The method may further include: upon reception of the charging processing information from an online charging system, the data centre management network element feeds back the charging processing information to the controller.

The information of the processing network element may include address or tunnel information of the processing network element;

the charging strategy information may include a charging level, a charging mode, a measurement method and a data usage report level;

the user state information may include a user identifier, user location information, service network information, an access network type, closed user group (CSG) information, and a charging feature for a subscriber; and the information of the UGW may include address or tunnel information of the UGW.

When the processing network element performs online charging, the charging for the traffic flow according to the charging strategy information and the user state information may include:

the processing network element requests and acquires a credit quota of each charging level from the online charging system, the credit quota comprising traffic and duration;

the processing network element calculates traffic and duration of the traffic flow, and monitors a usage extent of the credit quota of each charging level; and the processing network element sends a credit quota control update message to the online charging system and acquires an updated credit quota when the credit quota is expired.

When the processing network element performs offline charging, the charging for the traffic flow according to the charging strategy information and the user state information may include:

the processing network element calculates traffic and duration of the traffic flow according to the charging strategy information and the user state information, and monitors triggering of a charging event.

When the processing network element performs online charging, the method may further include:

upon reception of a user state information change notification message from the controller, the data centre management network element sends the user state information change notification message to the processing network element;

when a charging event is triggered and a credit quota is re-granted, the processing network element sends a credit quota control update message to the online charging system and acquires an updated credit quota;

when the credit quota in the online charging system is expired, the online charging system sends a session termination message to the data centre management network element.

When the processing network element performs offline charging, the method may further include:

upon reception of a user state information change notification message from the controller, the data centre management network element sends the user state information change notification message to the processing network element;

when the charging event is triggered, the processing network element sends the charging event and traffic and duration of the traffic flow to an offline charging system through a billing message: or, the processing network element sends a charging data record (CDR) of a generated calling record to the offline charging system through a data record transmission message.

The method may further include that when a session is terminated, the data centre management network element notifies the controller of a session termination message and releases a user plane channel/link by means of the controller;

when a session or a packet data protocol (PDP) context is deleted, the data centre management network element receives a charging-related session releasing message from the controller and notifies the processing network element to terminate charging and to report charging processing information;

the data centre management network element releases resources related to the processing network element and deletes the charging strategy information, the user state information and the information of the UGW.

A method for network charging includes:

user state information is received from a mobility management network element and charging strategy information is received from a charging rule network element, then a charging resource request message containing the charging strategy information, the user state information and information of a universal gateway (UGW) are sent to a data centre management network element;

information of a processing network element is received from the data centre management network element;

a flow table for the UGW is configured according to the information of the processing network element, and the configured flow table is sent to the UGW; and charging processing information fed back from the data centre management network element is received when the processing network element charges for a traffic flow.

The information of the processing network element may include address or tunnel information of the processing network element;

the charging strategy information may include a charging level, a charging mode, a measurement method and a data usage report level;

the user state information may include a user identifier, user location information, service network information, an access network type, CSG information and a charging feature for a subscriber; and the information of the UGW may include address or tunnel information of the UGW.

The method may further include that a user state information change notification message is sent to the data centre management network element, upon reception of the user state information change notification message from the mobility management network element.

The method may further include that:

when a session is terminated, a session termination message sent from the data centre management network element is received and a user plane channel/link is released;

when a session or a PDP context is deleted, a charging-related session releasing message is sent to the data centre management network element.

A data centre includes a data centre management network element and a processing network element, in which the data centre management network element is configured to, upon reception of a charging resource request message from a controller, support a charging function of a processing network element by a virtual machine and feed information of the processing network element back to the controller, wherein the charging resource request message comprises charging strategy information, user state information and information of a universal gateway (UGW); and configured to send the charging strategy information, the user state information and the information of the UGW to the processing network element, feed charging process information which is fed back from the processing network element back to the controller;

the processing network element is configured to implement transmission of a traffic flow with the UGW according to the information of the UGW, charge for the traffic flow according to the charging strategy information and the user state information, and feed the charging processing information back to the data centre management network element.

The data centre may further include an online charging system configured to send the charging processing information to the data centre management network element;

the data centre management network element is further configured to feed the charging processing information from the online charging system back to the controller.

The information of the processing network element may include address or tunnel information of the processing network element;

the charging strategy information may include a charging level, a charging mode, a measurement method and a data usage report level;

the user state information may include a user identifier, user location information, service network information, an access network type, CSG information, and a charging feature for a subscriber; and the information of the UGW may include address or tunnel information of the UGW.

when the processing network element performs online charging, the processing network element is further configured to request and acquire a credit quota of each charging level from the online charging system, the credit quota comprising traffic and duration, calculate traffic and duration of the traffic flow, and monitor a usage extent of the credit quota of each charging level; and configured to send a credit quota control update message to the online charging system and acquire an updated credit quota when the credit quota is expired;

the online charging system is configured to provide the credit quota of each charging level to the processing network element when receiving the request from the processing network element, and provide the updated credit quota to the processing network element upon reception of the credit quota control update message from the processing network element.

When the processing network element performs online charging, the processing network element is further configured to calculate traffic and duration of the traffic flow according to the charging strategy information and the user state information, and monitor triggering of a charging event.

When the processing network element performs online charging, the data centre management network element may be further configured to, upon reception of a user state information change notification message from the controller, send the user state information change notification message to the processing network element;

the processing network element is further configured to, when a charging event is triggered and a credit quota is re-granted, send a credit quota control update message to the online charging system and acquire an updated credit quota;

the online charging system is further configured to, when the credit quota in the online charging system is expired, send a session termination message to the data centre management network element.

When the processing network element performs offline charging, the data centre may further include an offline charging system, the data centre management network element is further configured to, upon reception of a user state information change notification message from the controller, send the user state information change notification message to the processing network element;

the processing network element is further configured to, when the charging event is triggered, send the charging event and traffic and duration of the traffic flow to an offline charging system through a billing message; or, send a generated CDR to the offline charging system through a data record transmission message;

the offline charging system is configured to receive from the processing network element the charging event and a calculation result of the traffic and duration of the traffic flow, or the CDR.

The data centre management network may be further configured to, when a session is terminated, notify the controller of a session termination message and release a user plain channel/link by means of the controller; when a session or a packet data protocol (PDP) context is deleted, receive a charging-related session releasing message from the controller and notify the processing network element to terminate charging and to report charging processing information; release resources related to the processing network element, and delete the charging strategy information, the user state information and the information of the UGW.

A controller includes a first receiving unit, a first sending unit, a second receiving unit, a configuration unit, a second sending unit and a third receiving unit, in which the first receiving unit is configured to receive user state information from a mobility management network element and charging strategy information from a charging rule network element;

the first sending unit is configured to send a charging resource request message containing the charging strategy information, the user state information and information of a UGW to a data centre management network element;

the second receiving unit is configured to receive information of a processing network element from the data centre management network element;

the configuration unit is configured to configure a flow table for the UGW according to the information of the processing network element;

the second sending unit is configured to send the configured flow table to the UGW; and the third receiving unit is configured to receive charging processing information fed back from the data centre management network element when the processing network element charges for a traffic flow.

The information of the processing network element may include address or tunnel information of the processing network element;

the charging strategy information may include a charging level, a charging mode, a measurement method, and a data usage report level;

the user state information may include a user identifier, user location information, service network information, an access network type, CSG information, and a charging feature for a subscriber; and the information of the UGW may include address or tunnel information of the UGW.

The controller may further include a third sending unit configured to send a user state information change notification message to the data centre management network element, upon reception of the user state information change notification message from the mobility management network element.

The controller may further include a releasing unit and a fourth sending unit, in which wherein the releasing unit is configured to, when a session is terminated, receive a session termination message from the data centre management network element and release a user plane channel/link;

the fourth sending unit is configured to, when a session or a packet data protocol PDP context is deleted, send a charging-related session releasing message to the data centre management network element.

A system for network charging includes any data centre as described above, any controller as described above and a UGW.

A storage medium which stores a computer programme configured to execute the method for network charging as described above.

The embodiments of the present disclosure provide a method, a controller, a data centre and a system for network charging, in which a data centre management network element supports, upon reception of a charging resource request message from a controller, a charging function of a processing network element by a virtual machine and feeds back information of the processing network element to the controller; wherein the charging resource request message comprises charging strategy information, user state information and information of a universal gateway (UGW); the data centre management network element sends the charging strategy information, the user state information and the information of the UGW to the processing network element, then, the processing network element implements transmission of a traffic flow with the UGW according to the information of the UGW, charges for the traffic flow according to the charging strategy information and the user state information, and feeds back charging processing information to the data centre management network element; and the data centre management network element feeds back the charging processing information to the controller. In this way, a SDN EPC network can be charged simply with low cost and high universality.

BRIEF DESCRIPTION OF THE DRAWINGS

FIG. 3 is a second schematic diagram of an implementation procedure of a method for network charging according to an embodiment of the present disclosure;

FIG. 4 is a schematic diagram of the structural composition of a data centre according to an embodiment of the present disclosure;

FIG. 9 is a schematic diagram of an implementation procedure of a method of network content charging according to an embodiment of the present disclosure.

DETAILED DESCRIPTION

The characteristics and technical contents of the present disclosure are illustrated in further detail through a detailed description of the implementation of the present disclosure with reference to accompanying figures, which are merely used for illustration but not for limitation.

Figure 1:
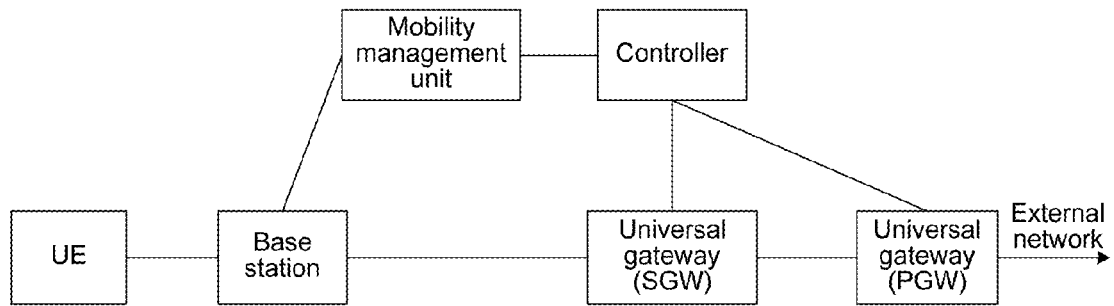
FIG. 1 is a schematic diagram of the system architecture of a SDN EPC.
Figure 2:
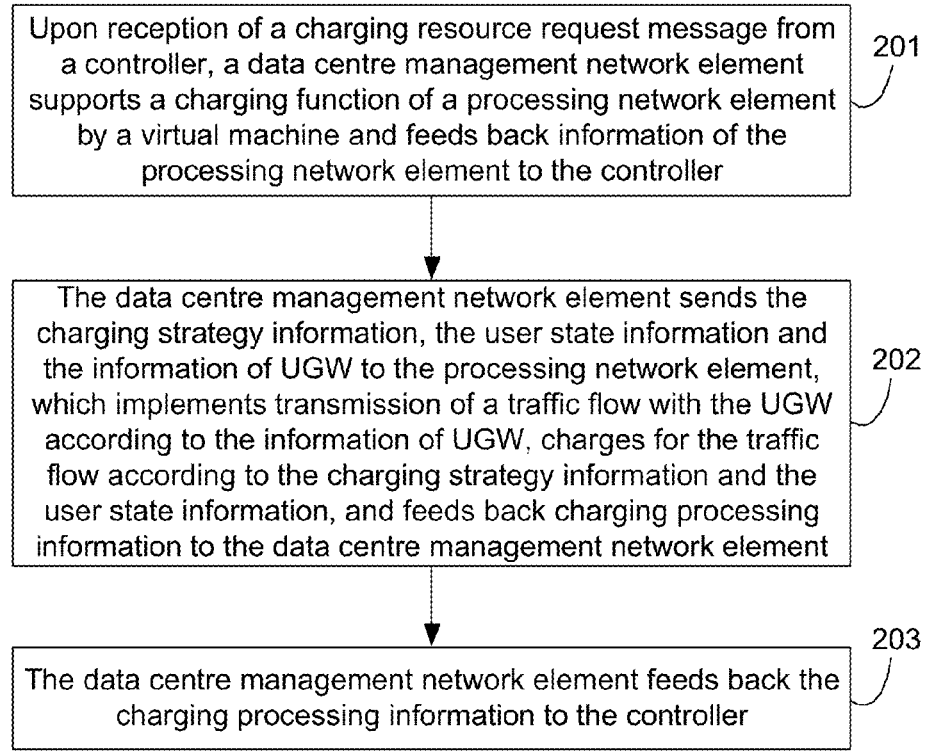
FIG. 2 is a first schematic diagram of an implementation procedure of a method for network charging according to an embodiment of the present disclosure.

An embodiment of the present disclosure describes a method for network charging performed by a data centre. As shown in FIG. 2, said method includes following steps:

Step 201: upon reception of a charging resource request message from a controller, a data centre management network element supports a charging function of a processing network element by a virtual machine and feeds back information of the processing network element to the controller.

The charging resource request message includes charging strategy information, user state information and information of a UGW.

Preferably, the method further includes that upon reception of charging processing information from an online charging system, the data centre management network element feeds back the charging processing information to the controller.

Preferably, the information of the processing network element comprises address or tunnel information of the processing network element;

the charging strategy information includes a charging level, a charging mode, a measurement method and a data usage report level;

the user state information includes a user identifier, user location information, service network information, an access network type, closed user group (CSG) information, and a charging feature for a subscriber;

the information of the UGW includes address or tunnel information of the UGW.

When the processing network element performs online charging, the charging for the traffic flow according to the charging strategy information and the user state information includes:

the processing network element requests and acquires a credit quota of each charging level from the online charging system, the credit quota including traffic and duration;

the processing network element calculates traffic and duration of the traffic flow, and monitors a usage extent of the credit quota of each charging level; the processing network element sends a credit quota control update message to the online charging system and acquires an updated credit quota when the credit quota is expired.

When the processing network element performs offline charging, the charging for the traffic flow according to the charging strategy information and the user state information includes:

the processing network element calculates traffic and duration of the traffic flow according to the charging strategy information and the user state information, and monitors triggering of a charging event.

Preferably, an Sxx interface defined in the embodiment of the present disclosure is supported between the data centre management network element and the controller, through which the data centre management network element may receive the charging resource requesting information from the controller. Furthermore, the data centre management network element may send control information for users from an online charging system or an offline charging system implemented by a virtual machine to the controller through the Sxx interface, then the controller accordingly processes user plane links. Furthermore, the controller may request and acquire address or tunnel information of the processing network element from the data centre management network element through the Sxx interface.

Step 202: the data centre management network element sends the charging strategy information, the user state information and the information of the UGW to the processing network element, and the processing network element then implements transmission of a traffic flow with the UGW according to the information of the UGW, charges for the traffic flow according to the charging strategy information and the user state information, and feeds back charging processing information to the data centre management network element.

Preferably, when the processing network element performs online charging, the method further includes:

upon reception of a user state information change notification message from the controller, the data centre management network element sends the user state information change notification message to the processing network element;

when a charging event is triggered and a credit quota is re-granted, the processing network element sends a credit quota control update message to the online charging system and acquires an updated credit quota;

when the credit quota in the online charging system is expired, the online charging system sends a session termination message to the data centre management network element.

Specifically, upon reception of service data to be charged from the UGW, the processing network element calculates traffic and duration of a traffic flow of each service, calculates all traffics and durations of services corresponding to each charging level based on the charging strategy information, the usage of traffic and duration being the usage of the credit quota, then monitors current remaining credit quota in real time, and when the credit quota is expired or the condition of credit reauthorization is satisfied, requests a new credit quota from the online charging system or start a credit reauthorization process. Accordingly, the online charging system is responsible for controlling the charging of credit quota, allocating a new credit quota or reauthorizing the credit quota to the processing network element. Moreover, when the credit quota is restricted, the online charging system notifies the data centre management network element to instruct the controller to cut off the user plane link.

Preferably, when the processing network element performs offline charging, the method further includes:

upon reception of a user state information change notification message from the controller, the data centre management network element sends the user state information change notification message to the processing network element;

when a charging event is triggered, the processing network element sends the charging event and a calculation result of traffic and duration of the traffic flow to an offline charging system through a billing message: or, the processing network element sends a charging data record (CDR) of a generated calling record to the offline charging system through a data record transmission message.

Step 203: the data centre management network element feeds back the charging processing information to the controller.

Preferably, the method further includes:

when a session is terminated, the data centre management network element notifies the controller of a session termination message and releases a user plane channel/link by means of the controller;

when a session or a packet data protocol (PDP) context is deleted, the data centre management network element receives a charging-related session releasing message from the controller and notifies the processing network element to terminate charging and to report charging processing information;

the data centre management network element releases resources related to the processing network element and deletes the charging strategy information, the user state information and the information of the UGW.

An embodiment of the present disclosure also describes a method for network charging performed by a controller. As shown in FIG. 3, said method includes following steps:

Step 301: user state information from a mobility management network element and charging strategy information from a charging rule network element are received, then a charging resource request message containing the charging strategy information, the user state information and information of the UGW are sent to a data centre management network element.

Preferably, a S11 or Gn interface in a general packet radio service tunnelling protocol-C (GTP-C) is supported between the controller and the mobility management network element, which enables the controller to be compatible with existing mobility management network element devices. The controller may acquire more user state information through the S11 or Gn interface.

Preferably, a Gx interface is supported between the controller and the charging strategy network element, which enables the controller to be compatible with an existing charging rule generation network element. The controller may acquire the charging strategy information through the Gx interface.

Preferably, an enhanced Open Flow protocol is supported between the controller and the UGW, which enables the controller to send service data to be charged to a virtual machine of the data centre which is used for collecting charging information, i.e. a processing network element.

Preferably, the information of the processing network element includes address or tunnel information of the processing network element;

the charging strategy information includes a charging level, a charging mode, a measurement method and a data usage report level;

the user state information includes a user identifier, user location information, service network information, an access network type, CSG information, and a charging feature for a subscriber;

the information of the UGW includes address or tunnel information of the UGW.

Step 302: information of the processing network element is received from the data centre management network element.

Preferably, the method further includes:

a user state information change notification message is sent to the data centre management network element, upon reception of the user state information change notification message from the mobility management network element.

Step 303: a flow table is configured for the UGW according to the information of the processing network element, and the configured flow table is sent to the UGW.

Step 304: charging processing information fed back from the data centre management network element is received when the processing network element charges for a traffic flow.

Preferably, the method further includes:

when a session is terminated, a session termination message from the data centre management network element is received and a user plane channel/link is released;

when a session or a PDP context is deleted, a charging-related session releasing message is sent to the data centre management network element.

An embodiment of the present disclosure also describes a data centre adapted for the above method for network charging. As shown in FIG. 4, said data centre includes a data centre management network element 41 and a processing network element 42, in which the data centre management network element 41 is configured to, upon reception of a charging resource request message from a controller, support a charging function of a processing network element by a virtual machine and feed information of the processing network element 42 back to the controller, wherein the charging resource request message comprises charging strategy information, user state information and information of a UGW; send the charging strategy information, the user state information and the information of the UGW to the processing network element 42, and feed charging process information back to the controller which is fed back from the processing network element 42;

the processing network element 42 is configured to implement transmission of a traffic flow with the UGW according to the information of UGW, charge for the traffic flow according to the charging strategy information and the user state information, and feed the charging processing information back to the data centre management network element 41.

Preferably, the data centre further includes an online charging system 43 configured to send the charging processing information to the data centre management network element;

the data centre management network element 41 is further configured to feed the charging processing information from the online charging system 43 back to the controller.

Preferably, the information of the processing network element includes address or tunnel information of the processing network element;

the charging strategy information includes a charging level, a charging mode, a measurement method and a data usage report level;

the user state information includes a user identifier, user location information, service network information, an access network type, CSG information, and a charging feature for a subscriber; and the information of the UGW includes address or tunnel information of the UGW.

Preferably, when the processing network element performs online charging, the processing network element 42 is further configured to request and acquire a credit quota of each charging level from the online charging system 43, the credit quota including traffic and duration, calculate traffic and duration of the traffic flow, and monitor a usage extent of the credit quota of each charging level, send a credit quota control update message to the online charging system 43 and acquire an updated credit quota when the credit quota is expired;

the online charging system 43 is configured to provide the credit quota of each charging level to the processing network element 42, and provide an updated credit quota to the processing network element 42 upon reception of a credit quota control update message from the processing network element 42.

Preferably, when the processing network element performs online charging, the processing network element 42 is further configured to calculate traffic and duration of the traffic flow according to the charging strategy information and the user state information, and monitor triggering of a charging event.

Preferably, when the processing network element 42 performs online charging, the data centre management network element 41 is further configured to, upon reception of a user state information change notification message from the controller, send the user state information change notification message to the processing network element 42;

the processing network element 42 is further configured to, when a charging event is triggered and a credit quota is re-granted, send a credit quota control update message to the online charging system 43 and acquire an updated credit quota;

the online charging system 43 is further configured to, when the credit quota in the online charging system 43 is expired, send a session termination message to the data centre management network element 41.

Preferably, when the processing network element performs offline charging, the data centre further includes an offline charging system 44, the data centre management network element 41 is further configured to, upon reception of a user state information change notification message from the controller, send the user state information change notification message to the processing network element 42;

the processing network element 42 is further configured to, when a charging event is triggered, send the charging event and a calculation result of traffic and duration of the traffic flow to an offline charging system 44 through a billing message; or, send a generated CDR to the offline charging system 44 through a data record transmission message;

the offline charging system 44 is configured to receive the charging event and the calculation result of traffic and duration of the traffic flow from the processing network element 42, or the CDR.

Preferably, the data centre management network 41 is further configured to, when the session is terminated, notify the controller of a session termination message and release a user plain channel/link by means of the controller; when a session or a PDP context is deleted, receive a charging-related session releasing message from the controller and notify the processing network element 42 to terminate charging and to report charging processing information; release resources related to the processing network element 42, and delete the charging strategy information, the user state information and the information of the UGW.

Figure 5:
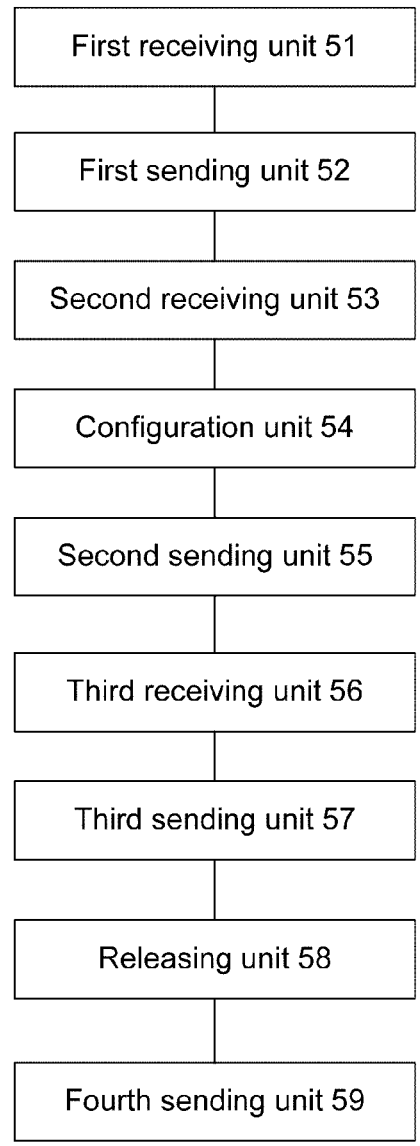
FIG. 5 is a schematic diagram of the structural composition of a controller according to an embodiment of the present disclosure.

An embodiment of the present disclosure also describes a controller adapted for the above method for network charging. As shown in FIG. 5, the controller includes a first receiving unit 51, a first sending unit 52, a second receiving unit 53, a configuration unit 54, a second sending unit 55 and a third receiving unit 56, in which the first receiving unit 51 is configured to receive user state information from a mobility management network element and charging strategy information from a charging rule network element;

the first sending unit 52 is configured to send a charging resource request message containing the charging strategy information, the user state information and information of a UGW to a data centre management network element;

the second receiving unit 53 is configured to receive information of the processing network element from the data centre management network element;

the configuration unit 54 is configured to configure a flow table for the UGW according to the information of the processing network element;

the second sending unit 55 is configured to send the configured flow table to the UGW;

the third receiving unit 56 is configured to receive charging processing information fed back from the data centre management network element when the processing network element charges for a traffic flow.

Preferably, the information of the processing network element includes address or tunnel information of the processing network element;

the charging strategy information includes a charging level, a charging mode, a measurement method and a data usage report level;

the user state information includes a user identifier, user location information, service network information, an access network type, CSG information and a charging feature for a subscriber;

the information of UGW includes address or tunnel information of the UGW.

Preferably, the controller further includes a third sending unit 57 configured to send a user state information change notification message to the data centre management network element, upon reception of the user state information change notification message from the mobility management network element.

Preferably, the controller further includes a releasing unit 58 and a fourth sending unit 59, in which the releasing unit 58 is configured to, when a session is terminated, receive a session termination message from the data centre management network element and release a user plane channel/link;

the fourth sending unit 59 is configured to, when a session or a packet data protocol PDP context is deleted, send a charging-related session releasing message to the data centre management network element.

Figure 6:
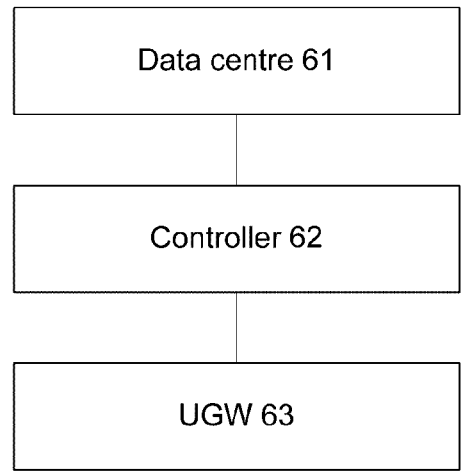
FIG. 6 is a schematic diagram of the structural composition of a system for network charging according to an embodiment of the present disclosure.

An embodiment of the present disclosure also describes a system for network charging adapted for the above method for network charging. As shown in FIG. 6, said data centre includes a data centre as shown in FIG. 4, a controller as shown in FIG. 5 and a UGW 63.

It should be understood by those skilled in the art that, the implementation of the function of the data centre 61 may be understood with reference to the data centre in FIG. 4, the implementation of the function of the controller 62 may be understood with reference to the controller in FIG. 5, and the implementation of the UGW 63 may be understood with reference to a combination of the data centre in FIG. 4 and the controller in FIG. 5.

The system for network charging according to the embodiments of the present disclosure may implement online charging, offline charging and content charging. Specifically, When the system for network charging implements online charging, the processing network element in the data centre specifically is a statistics network element, each statistics network element and the online charging system being implemented in the form of a virtual machine.

When the system for network charging implements offline charging, the processing network element in the data centre specifically is a statistics network element, each statistics network element and the offline charging system being implemented in the form of a virtual machine.

When the system for network charging implements content charging, the processing network element in the data centre specifically is a transmission detecting network element, the data centre including an online charging system and an offline charging system; each of the transmission detecting network element, the online charging system and the offline charging system is implemented in the form of a virtual machine.

It should be understood by those skilled in the art that, functions of various apparatuses in the system for network charging and interactive modes thereamong, etc. may be understood with reference to the descriptions related to the previous method for network charging, data centre, controller and UGW and will not be repeated here.

The method for network charging of the present disclosure is described in further detail with reference to specific embodiments.

Figure 7:
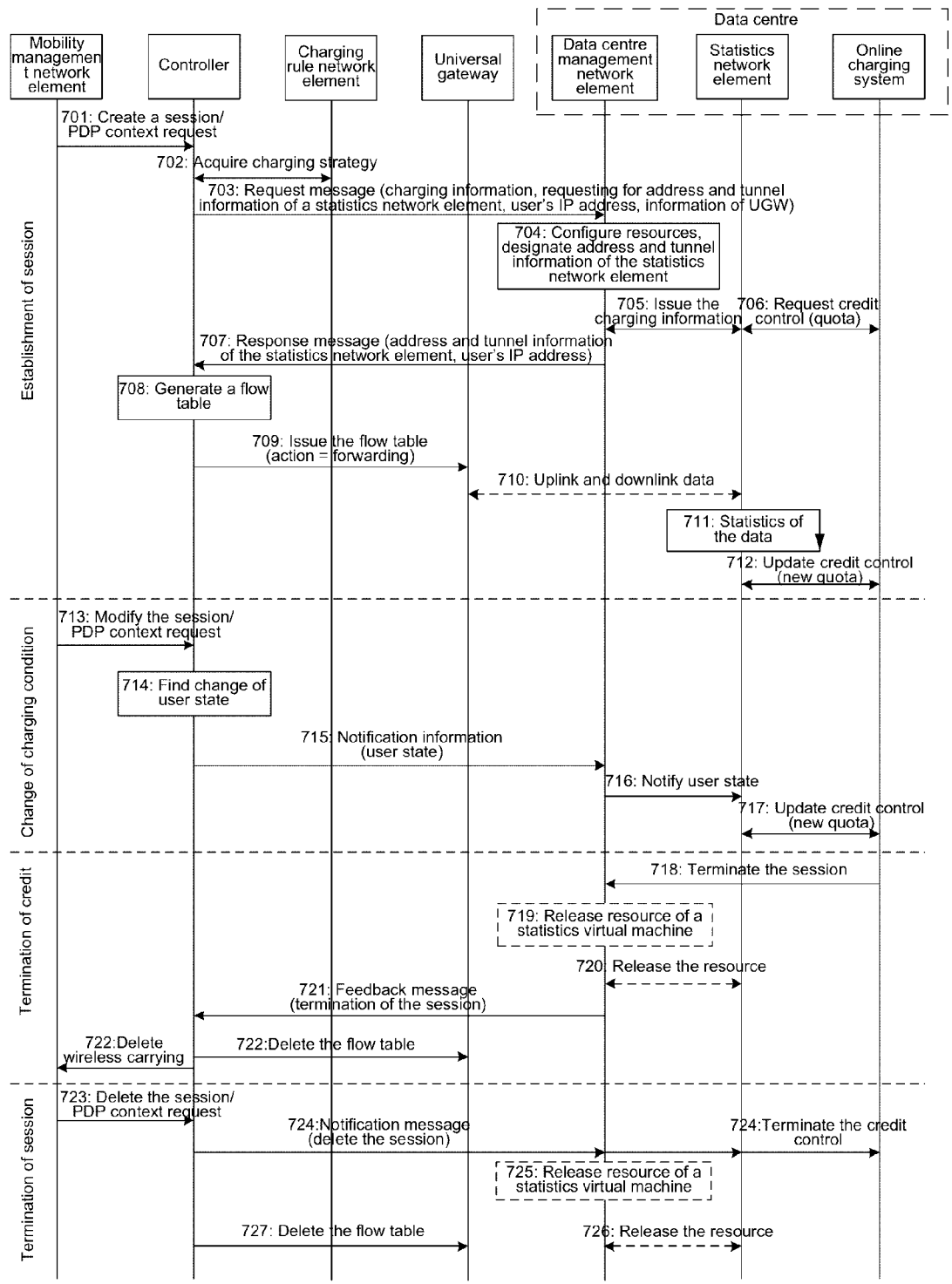
FIG. 7 is a schematic diagram of an implementation procedure of a method of online charging according to an embodiment of the present disclosure.

FIG. 7 is a schematic diagram of an implementation procedure of a method of online charging according to an embodiment of the present disclosure. As shown in FIG. 7, steps 701 to 712 illustrate an implementation procedure of online charging during the establishment of a session, steps 713 to 717 illustrate an implementation procedure of the online charging when a charging condition is changed, steps 718 to 722 illustrate an implementation procedure of the online charging when the credit authorisation is terminated, and steps 723 to 727 illustrates an implementation procedure of the online charging when the session is terminated.

Step 701: a mobility management network element sends a creating session or a PDP context charging message to a controller.

This step is to establish a user plane channel/link. The charging message includes a user identifier, a charging feature for a subscriber and the like.

Step 702: the controller acquires charging strategy information through an interaction with a charging rule network element.

Here, the charging strategy information includes a charging level, a charging mode, a measurement method, a charging report level and the like.

Step 703: the controller sends a charging message to a data centre management network element.

Here, the charging message includes charging information, requested address or tunnel information of a statistics network element, user's IP address and information of a UGW. The charging information includes a user identifier, a charging rule and the like.

Preferably, the tunnel information of the statistics network element, which is an optional parameter, is only included in the charging message when data is transmitted between the UGW and the statistics network element in a tunnel mode. The user's IP address may be provided by the data centre or designated by the controller. In the case that the user's IP address is designated by the controller, it is required that the data centre perform a network address translation (NAT) on the user's address, so as to guarantee the arrival of downlink data at the statistics network element. The information of a UGW includes address or tunnel information of the UGW, such that the statistical network element may perform the routing of the downlink data.

Step 704: the data centre management performs resource allocation.

Specifically, the data centre management network element implements the statistics network element with a virtual machine, configures its function and allocates address or tunnel information to the statistics network element.

Step 705: the data centre management network element issues the charging information and the information of the UGW to the statistics network element.

In this way, the statistics network element may identify the relationship between the service data and the charging rule and send the downlink data to the UGW through an IP or a tunnel.

Step 706: the processing network element acquires a credit quota of each charging level from the online charging system.

Here, the credit quota includes traffic and duration of the service data.

Step 707: the data centre management network element sends the address or tunnel information of the statistics network element and the IP address allocated by the data centre for a user to the controller in response to the charging message from the controller.

Step 708: the controller generates a flow table for the UGW.

In this way, the UGW may designate a routing for routing the traffic flow to be charged online to the statistics network element of the data centre according to the charging rule.

Step 709: the controller sends the flow table for the UGW with an OFPT_FLOW_MOD message of the Open Flow protocol.

Step 710: uplink data may be transmitted between the UGW and the statistics network element by an IP or a tunnel.

Step 711: the statistics network element of the data centre calculates the traffic and duration of the data and monitors the usage of the credit quota.

Step 712: when the credit quota is expired, the statistics network element sends a credit control update message to acquire a new credit quota.

Step 713: the mobility management network element informs the controller of a user state change message using a carrying or PDP context modification message when the access state information of the user changes, such that the mobility management network element supports charging.

Step 714: the controller informs the data centre management network element when the controller finds any change of the user state.

Step 715: the controller sends the access state information of the user to the data centre management network element through a notification message.

Step 716: the data centre management network element notifies the statistics network element of the user state.

Step 717: when the charging triggering event and the condition of credit authorisation are satisfied, the statistics network element acquires the new credit quota from the online charging system through the credit control update message.

Step 718: when the credit quota of the user in the online charging system is expired, the online charging system sends a session termination message to the data centre management network element.

Step 719, 720: the date centre management network element releases virtual machine resources of the statistics network element when charging resources are not in need.

Step 721: the data centre management network element notifies the controller of a session termination message in a feedback message, and the controller releases the user plane channel/link.

Step 722: the controller deletes information in the flow table related to the user online charging data, notifies the mobility management network element to delete information related to wireless carrying.

Step 723: the network deletes the session or PDP context due to a logout by the user or invalid subscription.

Step 724: the controller notifies the data centre management network element of the releasing of the session related to the online charging through a notification message. The data centre management network element further notifies the statistics network element to send a credit control termination message to the online charging system.

Step 725, 726: the data centre management network element releases the statistics virtual machine resources related to the online charging, deletes information such as the charging rule and user identifier when the online charging function is not in need.

Step 727: the controller deletes information related to the user online charging data from the flow table.

Figure 8:
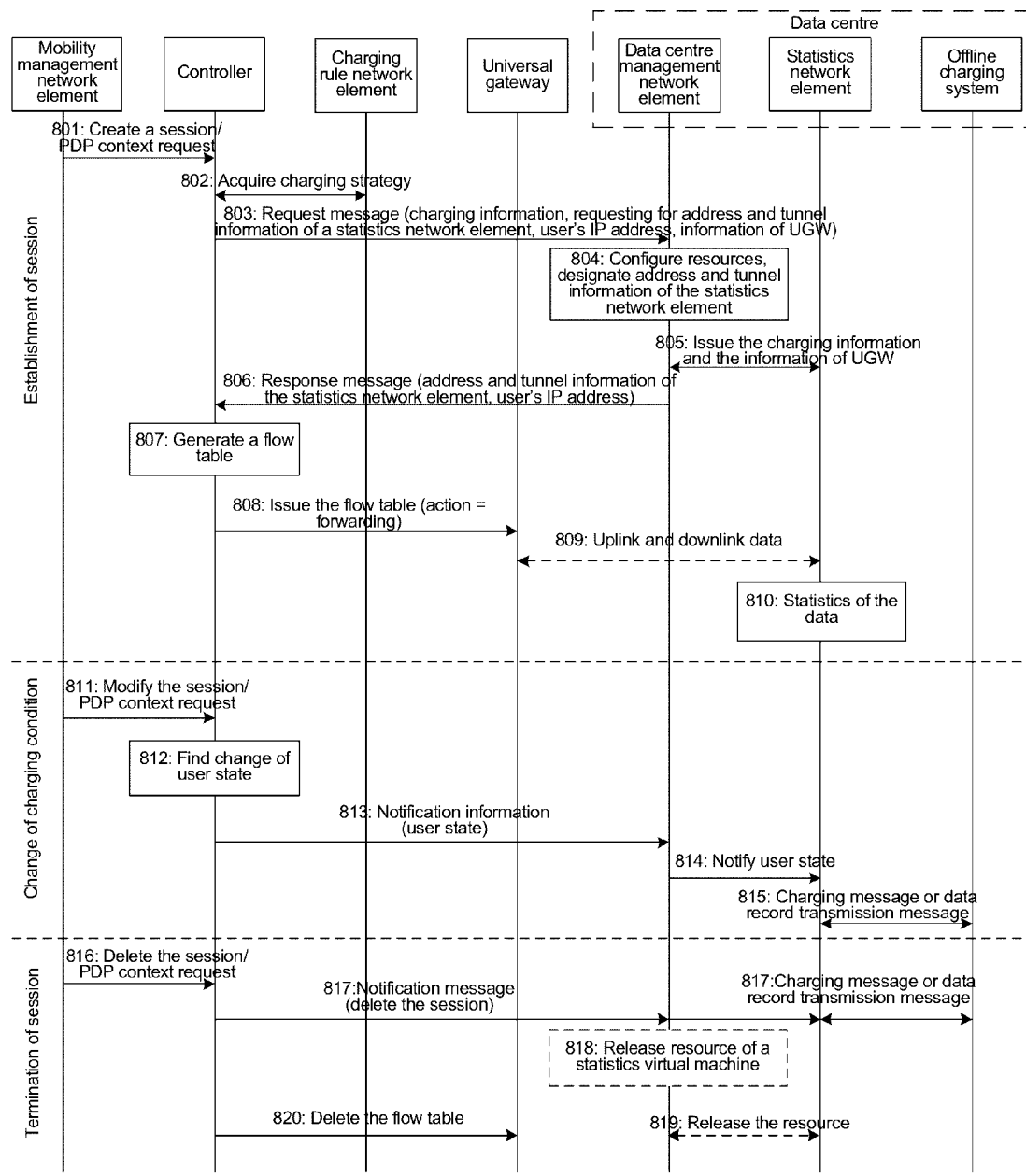
FIG. 8 is a schematic diagram of an implementation procedure of a method of offline charging according to an embodiment of the present disclosure.

FIG. 8 is a schematic diagram of an implementation procedure of the method of offline charging according to an embodiment of the present disclosure. As shown in FIG. 8, steps 801 to 810 illustrate an implementation procedure of an offline charging during the establishment of a session, steps 811 to 815 illustrate an implementation procedure of the offline charging during the change of charging condition, and steps 816 to 820 illustrates an implementation procedure of the offline charging during the termination of the session.

Step 801: a mobility management network element sends a creating session or PDP context charging message to a controller.

This step is to establish a user plane channel/link. The charging message includes a user identifier, a charging feature for a subscriber and the like.

Step 802: the controller acquires charging strategy information through an interaction with a charging rule network element.

Here, the charging strategy information includes a charging level, a charging mode, a measurement method, a charging report level and the like.

Step 803: the controller sends a charging message to a data centre management network element.

Here, the charging message includes charging information, requested address or tunnel information of a statistics network element, user's IP address and information of a UGW. The charging information includes a user identifier, a charging rule and the like.

Preferably, the tunnel information of the statistics network element, which is an optional parameter, is only included in the charging message when data is transmitted between the UGW and the statistics network element in a tunnel mode. The user's IP address may be provided by the data centre or designated by the controller. In the case that the user's IP address is designated by the controller, it is required that the data centre perform an NAT on the user's address, so as to guarantee the arrival of downlink data at the statistics network element. The information of UGW includes address or tunnel information of the UGW, such that the statistics network element may perform the routing of the downlink data.

Step 804: the data centre management performs resource allocation.

Specifically, the data centre management network element implements the statistics network element with a virtual machine, configures its function and allocates address or tunnel information thereto.

Step 805: the data centre management network element issues the charging information and the information of the UGW to the statistics network element.

In this way, the statistics network element may identify the relationship between the service data and the charging rule and send the downlink data to the UGW through an IP or a tunnel.

Step 806: the data centre management network element sends the address or tunnel information of the statistics network element and the IP address allocated for the user by the data centre to the controller in response to the charging message from the controller.

Step 807: the controller generates a flow table for the UGW.

In this way, the UGW may designate a routing for the traffic flow to be online charged to the statistics network element of the data centre according to the charging rule.

Step 808: the controller sends the flow table for the UGW with an OFPT_FLOW_MOD message of the Open Flow protocol.

Step 809: uplink data may be transmitted between the UGW and the statistics network element through an IP or a tunnel.

Step 810: the statistics network element of the data centre calculates the traffic and duration of the data and monitors the usage of the credit quota.

Step 811: the mobility management network element informs the controller of a user state change message using a carrying or PDP context modification message when the access state information of the user changes, such that the mobility management network element supports charging.

Step 812: the controller informs the data centre management network element when the controller finds any change of the user state.

Step 813: the controller sends the access state information of the user to the data centre management network element through a notification message.

Step 814: the data centre management network element notifies the statistics network element of the user state.

Step 815: when the change of the user state satisfies a charging event, the statistics network element sends the charging event and statistics information to an offline charging network element though a charging message, or sends a charging data record (CDR) of a generated calling record to the offline charging network element through a data record transmission message. The former is adapted for an Rf interface supported between the statistics network element and the offline charging network element, and the latter is adapted for a Ga Interface supported between the statistics network element and the offline charging network element.

Step 816: the network deletes a session or PDP context due to a logout by the user or invalid subscription.

Step 817: the controller notifies the data centre management network element of the releasing of the session related to the offline charging through a notification message. The data centre management network element further notifies the statistics network element to report the statistical information to the offline charging system through the charging message or the data record transmission message.

Step 818, 819: the data centre management network element releases the statistical virtual machine resources related to the online charging, deletes information such as the charging rule and user identifier when the charging resources are not in need.

Step 820: the controller deletes information related to the user offline charging data from the flow table.

FIG. 9 is a schematic diagram of an implementation procedure of a method of network content charging according to an embodiment of the present disclosure. As shown in FIG. 9, steps 901 to 914 illustrate an implementation procedure of an content charging during the establishment of a session, steps 915 to 919 illustrate an implementation procedure of the content charging during the change of charging condition, steps 920 to 924 illustrate an implementation procedure of the content charging during the termination of the credit authorisation (only adapted for online charging), and steps 925 to 929 illustrates an implementation procedure of the content charging during the termination of the session.

Step 901: a mobility management network element sends a creating session or PDP context charging message to a controller.

This step is to establish a user plane channel/link. The charging message includes a user identifier, a charging feature for a subscriber and the like.

Step 902: the controller acquires charging strategy information through an interaction with a charging rule network element.

Here, the charging strategy information includes: charging level, charging mode, measurement method, charging report level and the like.

Step 903: the controller sends a charging message to a data centre management network element.

Here, the charging message includes: charging information, requested address or tunnel information of a statistics network element, user's IP address and information of a UGW. The charging information includes user identifier, charging rule and the like.

Preferably, the tunnel information of the statistics network element, which is an optional parameter, is only included in the charging message when data is transmitted between the UGW and the statistics network element in tunnel mode. The user's IP address may be provided by the data centre or designated by the controller. In the case that the user's IP address is designated by the controller, it is required that the data centre perform an NAT on the user's address, so as to guarantee the arrival of downlink data at the statistics network element. The information of UGW includes address or tunnel information of the UGW, such that the statistical network element may perform the routing of the downlink data.

Step 904: the data centre management performs resource allocation.

Specifically, the data centre management network element implements a data centre transmission and detection network element with a virtual machine, configures functions of the data centre transmission and detection network element such as collecting data, controlling online charging credit, reporting offline charging information, etc., allocates address and/or user plane tunnel information to the data centre transmission and detection network element.

Step 905: the data centre management network element issues the charging information and the information of the UGW to the data centre transmission and detection network element.

In this way, the data centre transmission and detection network element may identify the relationship between the applications and the charging rule and send the downlink data to the UGW in IP or tunnel mode. The data centre transmission and detection network element may request a credit quota for content charging from the data centre content charging system, and detects and calculates the data received in downlink.

Step 906: the data centre management network element sends the address or tunnel information of the content charging system and the IP address allocated to the user by the data centre to the controller in response to the charging message from the controller.

Step 907: the controller generates a flow table for the UGW.

In this way, the UGW designates a route for routing the service data identified to need content charging according to the charging rule to the data centre transmission and detection network element of the data centre to perform content charging, and designates the routing of the service data which cannot be identified according to the charging rule to the data centre transmission and detection network element of the data centre to perform content detection and charging.

Step 908: the controller sends the flow table for the UGW with an OFPT_FLOW_MOD message of the Open Flow.

Step 909: uplink data may be transmitted between the UGW and the data centre transmission and detection network element in IP or tunnel mode.

Step 910: the data centre transmission and detection network element implements functions of data detection and statistics on the received uplink traffic flow.

Step 911: the data centre transmission and detection network element implements a function of online or offline charging.

For example, this may be reauthorization of credit quota of online charging, statistics of traffic and duration of online and offline charging, etc.

Step 912: the data centre transmission and detection network element detects application type in the traffic flow and reports it to the data centre management network element, which feeds back the application type to the controller.

In this way, the controller may acquire the applications carried in the service data corresponding to the flow table.

Step 913: after the controller acquires application information, the controller maintains the traffic flow forwarded to the data centre transmission and detection network element of the data centre when content charging for the traffic flow is needed, and forwards the traffic flow from the UGW to external network servers directly when content charging for the traffic flow is not needed.

Step 914: the controller issues the flow table to designate a new routing forward mode after acquiring the application information.

Step 915: the mobility management network element informs the controller a user state change message using a carrying or PDP context modification message when the access state information of the user changes, such that the mobility management network element supports charging.

Step 916: the controller informs the data centre management network element when the controller finds any change of the user state.

Step 917: the controller sends the access state information of the user to the data centre management network element through a notification message.

Step 918: the data centre management network element notifies the data centre transmission and detection network element of the user state.

Step 919: when the data centre transmission and detection network element performs online charging, and when the change of the user state satisfies the charging triggering event and the condition of credit authorisation, the data centre transmission and detection network element acquires the new credit quota from the data centre content charging system through the credit control update message. When the data centre transmission and detection network element performs offline charging, and when the change of the user state satisfies the charging triggering event, the data centre transmission and detection network element reports the charging event and statistical information to the offline charging network element.

Step 920: when the credit quota of the user in the data centre content charging system is expired, the data centre content charging system sends a session termination message to the data centre management network element.

Step 921, 922: the date centre management network element releases virtual machine resources of the data centre transmission and detection network element when charging resources are not in need.

Step 923: the data centre management network element notifies the controller of a session termination message through a feedback message, and the controller releases the user plane channel/link.

Step 924: the controller deletes information in the flow table related to the user content charging data, notifies the mobility management network element to delete wireless carrying.

Step 925: the network deletes the session or PDP context due to a logout by the user or invalid subscription.

Step 926: the controller notifies the data centre management network element of the releasing of the session related to the content charging through a notification message. The data centre management network element further notifies the data centre transmission and detection network element to terminate the online or offline charging session and to report the statistical information.

Step 927, 928: the data centre management network element releases the transmission and detection virtual machine resources related to the content charging, deletes information such as the charging rule and user identifier.

Step 929: the controller deletes information in the flow table related to the user content charging data.

The present disclosure also describes a storage medium in which a computer programme is stored, which is configured to any method for network charging according to previous embodiments.

Above descriptions are merely preferred embodiments of the present disclosure, but not to limit the scope of protection of the present disclosure.

INDUSTRIAL APPLICABILITY

The technical scheme of the present disclosure implements the charging service of a SDN EPC network simply with low cost and high universality.

The invention claimed is:
1. A method for network charging, comprising:
supporting, by a data centre management network element device, a charging function of a processing network element device by a virtual machine upon receiving a charging resource request message from a controller device, and feeding back information of the processing network element device to the controller device, wherein the charging resource request message comprises charging strategy information, user state information and information of a universal gateway (UGW);

Sending, by the data centre management network element device, the charging strategy information, the user state information and the information of the UGW to the processing network element device;

implementing, by the processing network element device, transmission of a traffic flow with the UGW according to the information of the UGW, charging for the traffic flow according to the charging strategy information and the user state information, and feeding back charging processing information to the data centre management network element device; and feeding back, by the data centre management network element device, the charging processing information to the controller device;

wherein when the processing network element device performs online charging, the charging for the traffic flow according to the charging strategy information and the user state information comprises:

the processing network element device requests and acquires from the online charging system a credit quota of each charging level, the credit quota comprising traffic and duration;

the processing network element device calculates traffic and duration of the traffic flow, and monitors a usage extent of the credit quota of each charging level; and the processing network element device sends a credit quota control update message to the online charging system and acquires an updated credit quota when the credit quota is expired.

2. The method for network charging according to claim 1, further comprising:

feeding back, by the data centre management network element device, upon reception of the charging processing information from an online charging system, the charging processing information to the controller device.

3. The method for network charging according to claim 1, further comprising: when the processing network element device performs online charging, sending, by the data centre management network element device, upon reception of a user state information change notification message from the controller device, the user state information change notification message to the processing network element device;

sending, by the processing network element device, when a charging event is triggered and a credit quota is re-granted, a credit quota control update message to the online charging system and acquiring an updated credit quota;

sending, by the online charging system, when the credit quota in the online charging system is expired, a session termination message to the data centre management network element device.

4. The method for network charging according to claim 1, wherein when the processing network element device performs offline charging, the charging for the traffic flow according to the charging strategy information and the user state information comprises:

the processing network element device calculates traffic and duration of the traffic flow according to the charging strategy information and the user state information, and monitors triggering of a charging event.

5. The method for network charging according to claim 4, further comprising: when the processing network element device performs offline charging, sending, by the data centre management network element device, upon reception of a user state information change notification message from the controller device, the user state information change notification message to the processing network element device;

sending, by the processing network element device, when the charging event is triggered, the charging event and traffic and duration of the traffic flow to an offline charging system through a billing message; or, sending, by the processing network element device, a charging data record (CDR) of a generated calling record to the offline charging system through a data record transmission message.

6. The method for network charging according to claim 1, further comprising:

notifying, by the data centre management network element device, when a session is terminated, the controller of a session termination message, and releasing a user plane channel/link by means of the controller device;

when a session or a packet data protocol (PDP) context is deleted, receiving, by the data centre management network element device, a charging-related session releasing message from the controller device and notifying the processing network element device to terminate charging and to report charging processing information;

releasing, by the data centre management network element device, resources related to the processing network element device and deleting the charging strategy information, the user state information and the information of the UGW.

7. A data centre, comprising:

a data centre management network element device and a processing network element device, wherein the data centre management network element device is configured to, upon reception of a charging resource request message from a controller device, support a charging function of a processing network element device by a virtual machine and feed information of the processing network element device back to the controller device, wherein the charging resource request message comprises charging strategy information, user state information and information of a universal gateway (UGW); and configured to send the charging strategy information, the user state information and the information of the UGW to the processing network element device, feed charging process information which is fed back from the processing network element device back to the controller device;

the processing network element device is configured to implement transmission of a traffic flow with the UGW according to the information of the UGW, charge for the traffic flow according to the charging strategy information and the user state information, and feed the charging processing information back to the data centre management network element device;

wherein when the processing network element device performs online charging, the processing network element is further configured to request and acquire a credit quota of each charging level from the online charging system, the credit quota comprising traffic and duration, calculate traffic and duration of the traffic flow, and monitor a usage extent of the credit quota of each charging level; and configured to send a credit quota control update message to the online charging system and acquire an updated credit quota when the credit quota is expired;

the online charging system is configured to provide the credit quota of each charging level to the processing network element device when receiving the request from the processing network element device, and provide the updated credit quota to the processing network element device upon reception of the credit quota control update message from the processing network element device.

8. The data centre according to claim 7, wherein the data centre further comprises an online charging system configured to send the charging processing information to the data centre management network element device;
the data centre management network element device is further configured to feed the charging processing information from the online charging system back to the controller device.

9. The data centre according to claim 7, wherein when the processing network element device performs online charging, the data centre management network element device is further configured to, upon reception of a user state information change notification message from the controller device, send the user state information change notification message to the processing network element device;
the processing network element is further configured to, when a charging event is triggered and a credit quota is re-granted, send a credit quota control update message to the online charging system and acquire an updated credit quota;
the online charging system is further configured to, when the credit quota in the online charging system is expired, send a session termination message to the data centre management network element device.

10. The data centre according to claim 7, wherein when the processing network element device performs online charging, the processing network element device is further configured to calculate traffic and duration of the traffic flow according to the charging strategy information and the user state information, and monitor triggering of a charging event.

11. The data centre according to claim 10, wherein when the processing network element performs offline charging, the data centre further comprises an offline charging system,
the data centre management network element device is further configured to, upon reception of a user state information change notification message from the controller device, send the user state information change notification message to the processing network element device;
the processing network element is further configured to, when the charging event is triggered, send the charging event and traffic and duration of the traffic flow to an offline charging system through a billing message; or, send a charging data record (CDR) of a generated calling record to the offline charging system through a data record transmission message;
the offline charging system is configured to receive from the processing network element device the charging event and a calculation result of the traffic and duration of the traffic flow, or the CDR.

12. The data centre according to claim 7, wherein the data centre management network element device is further configured to, when a session is terminated, notify the controller of a session termination message and release a user plain channel/link by means of the controller device; when a session or a packet data protocol (PDP) context is deleted, receive a charging-related session releasing message from the controller device and notify the processing network element device to terminate charging and to report charging processing information; release resources related to the processing network element device, and delete the charging strategy information, the user state information and the information of the UGW.

\* \* \* \* \*